United States Patent [19]

Knapp et al.

[11] 4,137,697

[45] Feb. 6, 1979

[54] BALE DENSITY STRUCTURE FOR CYLINDRICAL BALERS

[75] Inventors: William H. Knapp; Carmen S. Phillips; Walter A. Anderson, all of Memphis, Tenn.

[73] Assignee: International Harvester Company, Chicago, Ill.

[21] Appl. No.: 778,892

[22] Filed: Mar. 18, 1977

[51] Int. Cl.² .............................................. A01D 39/00
[52] U.S. Cl. ....................................... 56/341; 100/88; 242/86.5 R; 242/DIG. 3
[58] Field of Search .................... 56/341, 343; 100/88, 100/76; 242/18 R, DIG. 3, 86.5 R

[56] References Cited

U.S. PATENT DOCUMENTS

| 3,672,583 | 6/1972 | Harrison | 242/18 R |
|---|---|---|---|
| 3,672,584 | 6/1972 | Macedo et al. | 242/18 R |
| 3,897,841 | 8/1975 | Phillips et al. | 56/341 |
| 3,964,246 | 6/1976 | Kopaska | 56/341 |

*Primary Examiner*—Jay N. Eskovitz
*Attorney, Agent, or Firm*—Neal C. Johnson; F. David AuBuchon

[57] ABSTRACT

A baler adapted to be pulled along the ground to pick up a windrow of hay and roll the hay into a cylindrical bale of substantial size and weight. The bale is formed in a zone defined between a lower belt conveyor and a plurality of endless belts disposed in transversely spaced relation above the lower belt. The upper belts are disposed to encompass a substantial portion of the periphery of the bale being formed to compress the same to the desired density. A bale tightener assembly is pivotally mounted on the baler and includes rollers in engagement with the upper belts. The tightener assembly is biased against the belts by tension springs arranged and functional in a novel manner.

7 Claims, 3 Drawing Figures

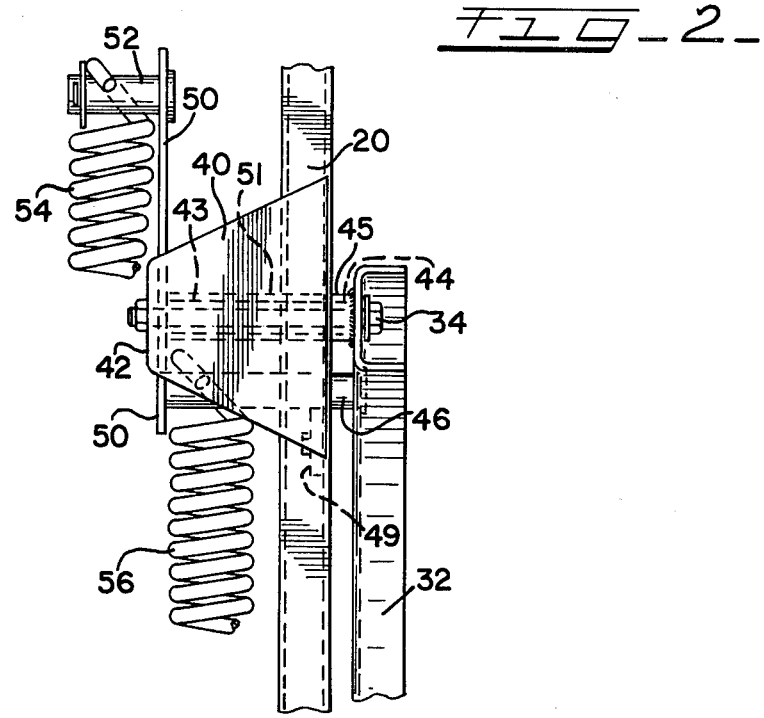
FIG_2_
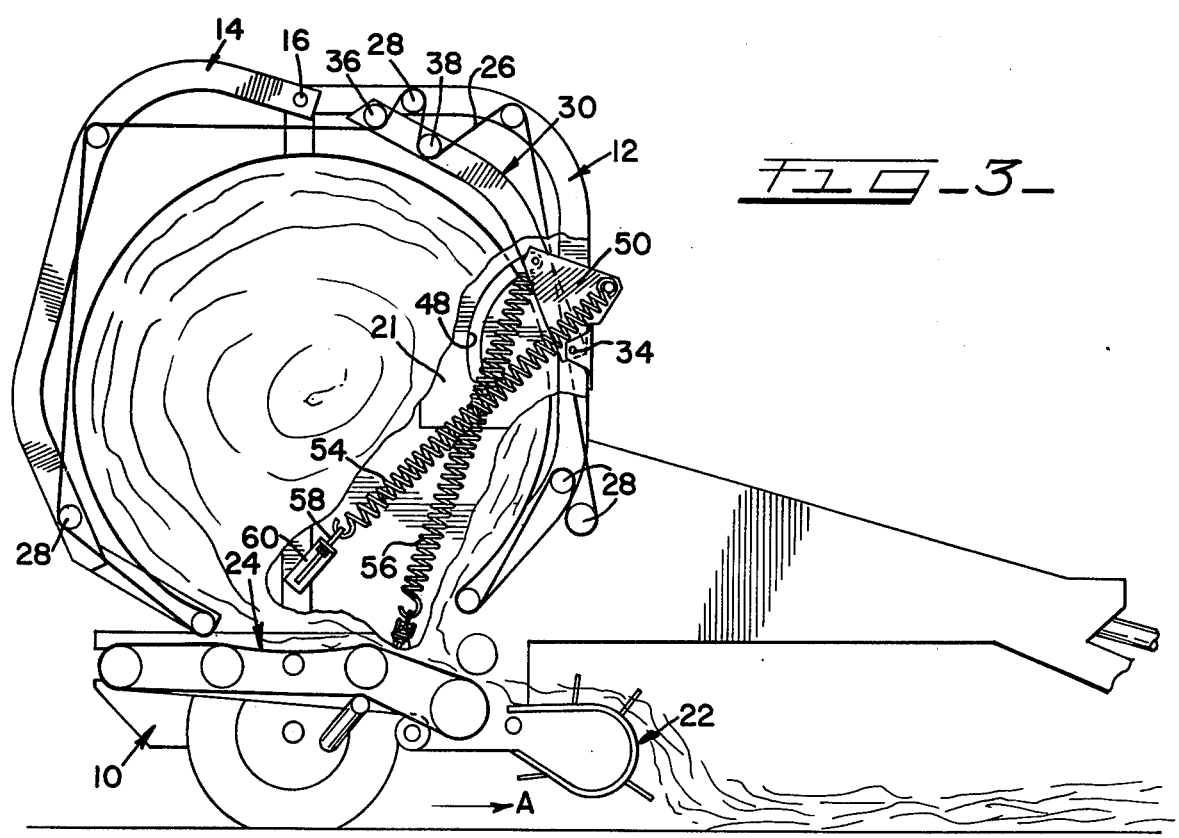
FIG_3_

BALE DENSITY STRUCTURE FOR CYLINDRICAL BALERS

BACKGROUND OF THE INVENTION

1. Field of the Invention

The invention relates generally to balers for forming cylindrical bales and more particularly to an improved bale density structure.

2. Prior Art

It is old in the art of cylindrical balers to provide variable bale density. U.S. Pat. No. 2,096,990 for example shows a releasing friction brake mechanism within a housing 104 in FIG. 7. U.S. Pat. No. 2,656,786 shows a density controlling mechanism described in columns 4, 5 and 6. U.S. Pat. No. 2,705,915 likewise shows a bale density controller. While these devices differ from each other in structural details they share the common factor of complexity in that each has a multitude of parts.

More modern examples of bale density structure are shown in U.S. Pat. No. 3,934,393 and U.S. Pat. No. 3,914,926 wherein respective pairs of parallel springs 116, 116 and 138, 139 are effective in tension on a bale tightener structure. In such arrangements the paired springs function in unison with no means or reason for adjustment independently.

SUMMARY

The invention provides an improved and simplified bale density control apparatus for use in a cylindrical baler. The apparatus includes means for preselecting the initial operative moment of one of a pair of tension springs without changing the moment of the other spring thereby controlling the density of the center of a bale relative to the density of the subsequently formed outer portion. The invention is greatly simplified as compared with the complex mechanisms in the art referred to above. Further, the invention provides a degree of selectivity of bale density control not provided by parallel spring arrangements.

It is a primary object of the invention to provide a bale density control apparatus wherein the density of the center of the bale may be varied relative to that of the subsequently formed outer portion of the bale.

A further object is to accomplish the foregoing object with a much simpler less costly mechanism than heretofore available.

A still further object is to provide a bale density control quickly and easily adjustable by the operator.

BRIEF DESCRIPTION OF THE DRAWINGS

FIG. 2 is an enlarged fragmentary view of a portion of the bale density structure taken generally in the direction of arrows 2—2 of FIG. 1; and FIG. 3 is a schematic view of a baler showing the later stages of bale formation.

DESCRIPTION OF THE PREFERRED EMBODIMENT

Figure 1:
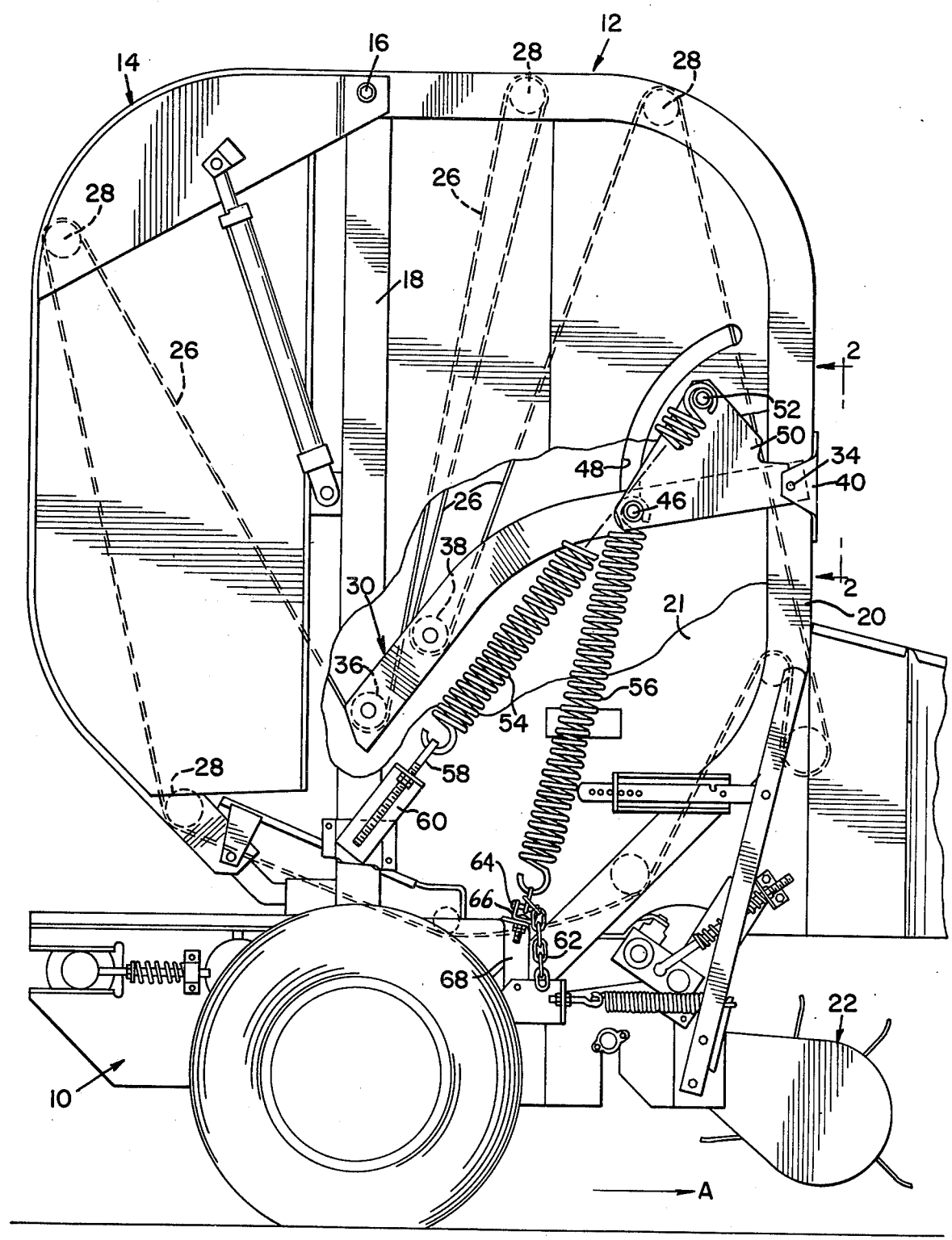
FIG. 1 is a fragmentary side elevation view of a cylindrical baler utilizing the apparatus of the invention.

Referring to FIGS. 1 and 3 there is shown a baler having details of construction shown in U.S. Pat. Nos. 3,895,573, 3,897,841, and 3,981,391 and marketed by the assignee of this invention under the model designation No. 241. In general the baler includes a wheeled frame 10 adapted for towing in the direction of arrow A by a tractor (not shown). The frame 10 supports a superstructure comprising a fixed framework 12 and a rearwardly opening gate 14 pivotally connected at 16 to the framework 12. The framework 12 includes a vertical frame member 18 and a C-shaped frame member 20 of channel section at each side of the baler interconnected by suitable cross bracing (not shown). In practice the sides of the framework 12 are closed by side sheets 21. The baler includes a hay pickup 22 pivotally connected to the forward end of the wheeled frame 10 for picking up windrowed hay from the ground and feeding it rearwardly into a bale-forming zone.

The bale-forming zone is defined generally by a lower endless belt 24 extending the width of the baler and a plurality of upper belts 26 disposed in spaced parallel relation across the baler. In well known manner the hay is fed rearwardly by the pickup 22 onto the lower belt 24 and is caused to roll onto itself to form a cylindrical bale by the oppositely driven upper belts 26. The belts 26 are trained on a plurality of rollers 28 journalled on the framework 12 and gate 14.

The baler includes a belt tightener assembly shown generally at 30 which includes an arm 32 of channel section on each side of the framework 12. The arms 32 are rigidly interconnected by suitable cross bracing to provide a unitary structure which is pivotally mounted on the frame members 20 by coaxial pivot bolts 34, one of which being shown in FIG. 2. The tightener assembly includes a pair of belt tightening rollers 36 and 38 journalled in the arms 32 and disposed in running engagement with the upper belts 26.

In accordance with the invention novel means are provided for imposing a spring force on the tightener assembly 30 to maintain the belts 26 in compressive engagement with the periphery of a bale after initial formation. A pivot bracket 40 is bolted or welded to the frame member 20 and has a rearwardly turned flange 42 to which the outer end of the pivot bolt 34 is secured. A tubular spacer 43 surrounds the bolt 34 between the flange 42 and the main frame member 20. A similar spacer 44 surrounds the bolt 34 between the frame member 20 and the arm 32. The spacers 43 and 44 serve to rigidify the mounting of the bolt 34. Additionally, a tubular bushing 45 is welded to the arm 32 and is received on the spacer 44 to provide adequate pivotal support for the arm 32. A pin 46 is secured to the arm 32 and projects outwardly through an arcuate slot 48 defined through the side sheet 21. The pin 46 rests against a stop plate 49 shown in dotted lines in FIG. 2. The stop plate 49 is the same in construction and function as the plate 148 in FIG. 4 of U.S. Pat. No. 3,895,573. A generally triangular plate 50 is pivotally connected to the pivot bolt 34 and to the outer end of the pin 46 for conjoint pivotal movement with the tightener arm 32. Adequate pivotal support for the plate 50 is provided by a tubular bushing 51 welded thereto and received on the spacer 43. A pin 52 is rigidly secured to the top portion of the plate 50 and projects outwardly therefrom as shown in FIG. 2.

The spring force operative on the belt tightener assembly 30 is provided by a pair of elongated coil springs 54 and 56. The spring 54 is hooked to the plate mounted pin 52 and extends downwardly and rearwardly into connection with an eye bolt 58 threadedly connected to a bracket 60 bolted to the baler frame member 18. The other spring 56 is hooked onto the pin 46 and extends downwardly into connection with a chain 62. The chain 62 is connected to a small pin 64 removably connected to a yoke 66 which is threadedly connected to a bracket 68 bolted to the lower portion of the frame member 20. It will be understood that the tightener force structure just described is duplicated on the opposite side of the baler. It is apparent in FIG. 1 that the springs 54 and 56 are arranged to exert their respective forces on the tightener assembly 30 through moment arms from the pivot bolt 34 of different lengths.

In operation the spring 54 is designed to be preset at a given length and not adjusted thereafter. The effective length of the spring 56 is easily preselected by varying the attachment point of the chain 62 to the pin 64 and yoke 66. For most crop and baling conditions the spring 56 is set in an initial loose condition so as to become effective on the tightening assembly at some point after initial upward movement of the tightener assembly as the bale is formed. In other words only the spring 54 is effective initially to thus provide a bale "core" of less density than the outer portions when the spring 56 becomes effective. It will be noted in FIG. 3 that the moment arm of the spring 54 has decreased considerably as the assembly 30 reaches its upper position commensurate with a full size bale. Due principally to this fact the combined moments of both springs 54 and 56 reach a maximum value prior to completion of the bale and actually decrease in the last stages of bale formation. This results in a "flatter" torque curve when plotting moments during upward movement of the tightener assembly 30 — a result found to be advantageous.

It is believed apparent that the invention provides a simple easily adjusted means for determining the ultimate variable density of a bale.

What is claimed is:

1. In a baler of the type having a plurality of driven belts effective in tension to compress a cylindrical bale being formed, an improved system for controlling the density of the bale comprising:
   a belt tension unit movable on the baler to impose tension on the belts;
   and means including two springs cooperating with said unit for initially exerting a force from only one of said springs and, upon the bale reaching a predetermined size, exerting a force from both of said springs to move the unit to compress the bale with a density less at its center than its surrounding portions.

2. In a baler for cylindrical bales, comprising:
   a mobile frame;
   means on said frame for picking up windrowed hay and rolling the same into a cylindrical bale, said means including a plurality of endless belts defining an expansible bale-forming zone;
   a belt tightener assembly pivotal on the frame to maintain belt tension on a bale being formed;
   and a pair of springs connected between said frame and said tightener assembly effective in tension to impose tension on said belts as a bale grows in diameter in said zone, means connecting one of said springs to be effective in tension subsequent to initial tension in the other, whereby the bale is formed with its center of less density than its surrounding portions.

3. The subject matter of claim 2, including means for adjusting said one spring to vary the interval between the tensioning of both said springs.

4. In a baler for cylindrical bales, comprising:
   a mobile frame;
   means on said frame for picking up windrowed hay and rolling the same into a cylindrical bale, said means including a plurality of endless belts defining an expansible bale-forming zone;
   a belt tightener assembly pivotal on said frame about a transverse pivot axis to impose tension on said belts to compress a bale being formed;
   a pair of springs connected in tension between said assembly and said baler frame for maintaining tension on said belts during bale formation;
   means for preselecting the initial operative moment of one spring without varying the moment of the other whereby the density of the center of the bale is decreased relative to that of the outer and subsequently formed portion of the bale.

5. In a baler of the type having a plurality of driven belts effective in tension to compress a cylindrical bale being rollably formed, an improved bale density control system comprising:
   a belt tightener assembly pivotally mounted on the baler for imposing tension on said belts during bale formation wherein said assembly swings through an arc as the bale grows in diameter;
   means for imposing a first tensile force on said assembly during movement of said assembly through the entire arc;
   and means for imposing a second tensile force on said assembly after movement thereof through an initial range, whereby the central or inner portion of the bale formed under the first tensile force will be of less density than that formed under both said first and second forces.

6. The subject matter of claim 5, including means for reducing said first tensile force as said assembly swings through the latter stages of bale formation.

7. In a baler of the type having a plurality of driven belts effective in tension to compress a cylindrical bale being rollably formed, an improved bale density control system comprising:
   a belt tightener assembly pivotally mounted on the baler for imposing tension on said belts during bale formation wherein said assembly pivots unidirectionally through an arcuate range as the bale grows in diameter;
   a first spring means for exerting a force on said assembly during movement thereof through the entire range;
   and a second spring means for exerting a force on said assembly during only a latter part of said range of movement as the bale is completed whereby the central or inner portion of the bale formed under the first spring force will be of less density than that formed under both the first and second spring forces.

* * * * *